United States Patent
Ho et al.

(10) Patent No.: US 9,630,364 B2
(45) Date of Patent: Apr. 25, 2017

(54) THREE-DIMENSIONAL PRINTING APPARATUS AND NOZZLE TEMPERATURE ADJUSTMENT METHOD THEREOF

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Kwan Ho, New Taipei (TW); Chien-Ying Huang, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

(*) Notice: Subject to any disclaimer, the term of this patent is extended or adjusted under 35 U.S.C. 154(b) by 424 days.

(21) Appl. No.: 14/180,328

(22) Filed: Feb. 13, 2014

(65) Prior Publication Data
US 2015/0165688 A1    Jun. 18, 2015

(30) Foreign Application Priority Data
Dec. 13, 2013 (TW) .............................. 102146213 U

(51) Int. Cl.
*B29C 67/00* (2006.01)

(52) U.S. Cl.
CPC ...... *B29C 67/0088* (2013.01); *B29C 67/0055* (2013.01)

(58) Field of Classification Search
CPC ............ B29C 67/0055; B29C 67/0059; B29C 67/0062; B29C 67/0066; B29C 67/007; B29C 67/0074; B29C 67/0077; B29C 67/0081; B29C 67/0085; B29C 67/0088;
(Continued)

(56) References Cited

U.S. PATENT DOCUMENTS

| 9,126,365 B1* | 9/2015 | Mark | B29C 70/20 |
| 2013/0241102 A1* | 9/2013 | Rodgers | B29C 47/0014 264/132 |
| 2014/0070461 A1* | 3/2014 | Pax | B29C 67/0055 264/401 |

FOREIGN PATENT DOCUMENTS

| CN | 101460050 | 11/2012 |
| TW | 201219196 | 5/2012 |

OTHER PUBLICATIONS

"Office Action of Taiwan Counterpart Application", issued on Nov. 11, 2015, p. 1-p. 7, in which the listed references were cited.

* cited by examiner

*Primary Examiner* — Ryan Ochylski
(74) *Attorney, Agent, or Firm* — Jianq Chyun IP Office

(57) ABSTRACT

A three-dimensional (3-D) printing apparatus and a nozzle temperature adjustment method thereof are provided, and the nozzle temperature adjustment method includes the following. A first melting point temperature of a first feed material and a second melting point temperature of a second feed material are read when a feed material switch procedure is executed. The first melting point temperature and the second melting point temperature are compared, and the higher one is selected to serve as an initial conversion temperature. After executing a slag processing procedure according to the initial conversion temperature, the initial conversion temperature is adjusted to the second melting point temperature.

4 Claims, 4 Drawing Sheets

(58) Field of Classification Search
CPC ......... B33Y 30/00; B33Y 10/00; B33Y 50/00; B33Y 50/02
See application file for complete search history.

THREE-DIMENSIONAL PRINTING APPARATUS AND NOZZLE TEMPERATURE ADJUSTMENT METHOD THEREOF

CROSS-REFERENCE TO RELATED APPLICATION

This application claims the priority benefit of Taiwan application serial no. 102146213, filed on Dec. 13, 2013. The entirety of the above-mentioned patent application is hereby incorporated by reference herein and made a part of this specification.

BACKGROUND

Technical Field

The technical field relates to a printing apparatus and more particularly relates to a three-dimensional printing apparatus and a nozzle temperature adjustment method thereof.

Description of Related Art

With the progress in computer-aided manufacturing (CAM), manufacturers have developed the technology of three-dimensional (3-D) printing for rapidly embodying an original design concept. In fact, the 3-D printing technology is a collective term referring to a series of rapid prototyping (RP) techniques, and the basic principle is laminate manufacture, wherein a rapid prototyping machine is used to form cross-sectional shapes of a workpiece in the X-Y plane through scanning, shift inteiniittently at a layer thickness in the Z coordinates, and ultimately form 3-D objects. The 3-D printing technology is applicable regardless of the geometric shapes and the RP technology produces excellent outputs in particular for complex parts, which saves efforts and processing time significantly. The 3-D printing technology is capable of presenting an object of a digital 3-D model designed by means of computer-aided design (CAD) software in less time for the user to touch and actually feel the geometry of the model, or even to test the assemblability of the parts and possible functions.

At present, most of the 3-D printing apparatuses that utilize the aforementioned RP method to form 3-D objects transport a hot melt wire material to a melting nozzle by a feed material mechanism, and then heat and melt the hot melt wire material through the melting nozzle to apply the hot melt wire material layer by layer on a base, thereby forming the 3-D object. Due to material properties, different hot melt wire materials may have different melting points. If the temperature of the melting nozzle is too high, the heated hot melt wire material may deteriorate or even burn. However, if the temperature of the melting nozzle is too low, the hot melt wire material may not be melted completely, which results in jam or residue of the hot melt wire material in the feed material mechanism or the nozzle. Therefore, how to control the temperature of the melting nozzle in an ideal state is a concern of persons skilled in the art.

SUMMARY

In view of the above, one of the exemplary embodiments provides a three-dimensional printing apparatus and a nozzle temperature adjustment method thereof for preventing residue of feed materials in a feed material mechanism during the period of switching the feed materials.

One of exemplary embodiments provides a nozzle temperature adjustment method adapted for adjusting a temperature of a melting nozzle. When the melting nozzle has fed in a first feed material and switches to feed in a second feed material, the nozzle temperature adjustment method includes the following steps. When a feed material switch procedure is executed, a first melting point temperature of the first feed material and a second melting point temperature of the second feed material are read. The first melting point temperature and the second melting point temperature are compared, and the higher one is selected to serve as an initial conversion temperature. After executing a slag processing procedure according to the initial conversion temperature, the initial conversion temperature is adjusted to the second melting point temperature.

According to one exemplary embodiment, the step of the slag processing procedure includes: if the first melting point temperature is the higher melting point temperature, controlling the initial conversion temperature to recover from the first melting point temperature to the second melting point temperature. If the second melting point temperature is the higher melting point temperature, the initial conversion temperature is controlled and maintained at the second melting point temperature.

According to one exemplary embodiment, the nozzle temperature adjustment method further includes: controlling a feeding roller set to feed materials to the melting nozzle.

According to one exemplary embodiment, the step of controlling the initial conversion temperature to recover from the first melting point temperature to the second melting point temperature if the first melting point temperature is the higher melting point temperature includes: if the initial conversion temperature is not equal to the second melting point temperature, controlling a feeding speed of the feeding roller set to be an acceleration state; determining whether the initial conversion temperature is equal to the second melting point temperature; and if the initial conversion temperature is equal to the second melting point temperature, controlling the feeding speed of the feeding roller set to be a normal state.

According to one exemplary embodiment, the step of controlling the feeding speed of the feeding roller set to be the acceleration state to lower the initial conversion temperature if the initial conversion temperature is higher than the second melting point temperature includes: activating a cooling module, wherein the cooling module performs a cooling procedure on the melting nozzle to lower the initial conversion temperature.

According to one exemplary embodiment, the step of controlling to maintain the initial conversion temperature at the second melting point temperature if the second melting point temperature is the higher melting point temperature includes: determining whether the initial conversion temperature is equal to the second melting point temperature; if the initial conversion temperature is not equal to the second melting point temperature, controlling the feeding speed of the feeding roller set to be a deceleration state and continuing heating the melting nozzle; and if the initial conversion temperature is equal to the second melting point temperature, controlling the feeding speed of the feeding roller set to be the normal state.

According to one exemplary embodiment, the step of selecting the higher one of the first melting point temperature and the second melting point temperature as the initial conversion temperature includes: if the first melting point temperature is the higher melting point temperature, selecting the first melting point temperature as the initial conversion temperature; and determining whether the initial conversion temperature is equal to the first melting point temperature, wherein, if the initial conversion temperature is not equal to the first melting point temperature, heating the melting nozzle to raise the initial conversion temperature to the first melting point temperature.

According to one exemplary embodiment, the step of selecting the higher one of the first melting point temperature and the second melting point temperature as the initial conversion temperature includes: if the second melting point temperature is the higher melting point temperature, selecting the second melting point temperature as the initial conversion temperature; and heating the melting nozzle to raise the initial conversion temperature to the second melting point temperature.

According to one exemplary embodiment, the nozzle temperature adjustment method further includes the following step before the step of heating the melting nozzle to raise the initial conversion temperature to the second melting point temperature: determining whether the initial conversion temperature is equal to the first melting point temperature; if the initial conversion temperature is not or equal to the first melting point temperature, heating the melting nozzle; and if the initial conversion temperature is equal to the first melting point temperature, driving a feeding roller set.

One of exemplary embodiments provides a three-dimensional printing apparatus that includes a melting nozzle, a feeding roller set, a temperature sensor, and a controller. The feeding roller set feeds a first feed material or a second feed material to the melting nozzle. The temperature sensor is coupled to the melting nozzle for sensing an initial conversion temperature of the melting nozzle. The controller is coupled to the melting nozzle, the feeding roller set, and the temperature sensor for comparing a first melting point temperature of the first feed material and a second melting point temperature of the second feed material and selecting the higher one as the initial conversion temperature. The controller adjusts the initial conversion temperature to the second melting point temperature after executing a slag processing procedure according to the initial conversion temperature.

According to one exemplary embodiment, the three-dimensional printing apparatus further includes a cooling module. The cooling module is coupled to the controller and performs a cooling procedure on the melting nozzle to lower the initial conversion temperature.

According to one exemplary embodiment, the three-dimensional printing apparatus further includes a feeding speed adjustment module. The feeding speed adjustment module is coupled to the controller and the feeding roller set for controlling a feeding speed of the feeding roller set to be an acceleration state, a deceleration state, or a normal state.

According to one exemplary embodiment, the three-dimensional printing apparatus further includes a heating module. The heating module is coupled to the controller and the melting nozzle and performs a heating procedure on the melting nozzle to raise the initial conversion temperature.

Based on the above, in the exemplary embodiments, when the feed material switch procedure is executed to switch from the first feed material to the second feed material, the first melting point temperature of the first feed material and the second melting point temperature of the second feed material are compared. Moreover, the higher one of the first melting point temperature and the second melting point temperature is selected as the initial conversion temperature of the melting nozzle, so as to discharge the residual first feed material that enters the melting nozzle first by the higher temperature. Accordingly, the problem of residue of the first feed material in the nozzle or the feeding roller set due to incomplete melting, caused by directly cooling the melting nozzle during switching of the feed materials, is prevented.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the exemplary embodiments, and are incorporated in and constitute a part of this specification. The drawings illustrate exemplary embodiments of the and, together with the description, serve to explain the principles of the exemplary embodiments.

DESCRIPTION OF THE EMBODIMENTS

Figure 1:
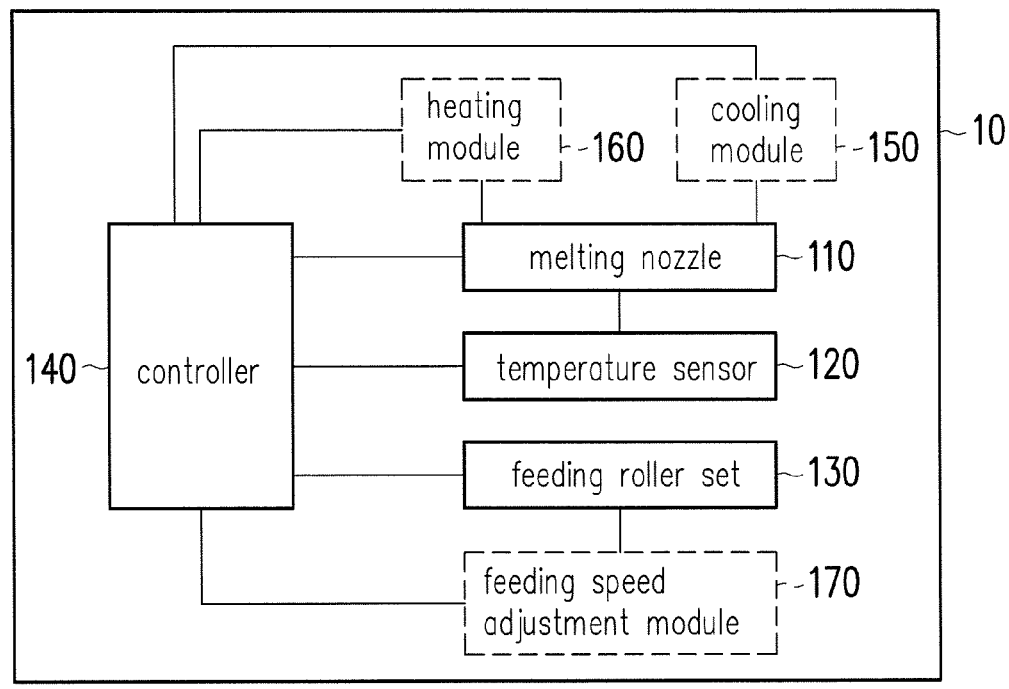
FIG. 1 is a block diagram illustrating a three-dimensional printing apparatus according to an exemplary embodiment.

Descriptions are given with reference to the exemplary embodiments illustrated with accompanied drawings. In addition, wherever possible, identical or similar reference numerals stand for identical or similar elements in the figures and embodiments.

FIG. 1 is a block diagram illustrating a three-dimensional printing apparatus according to an exemplary embodiment. A three-dimensional printing apparatus 10 is adapted for printing a three-dimensional object according to digital three-dimensional model information. With reference to FIG. 1, in this embodiment, the three-dimensional printing apparatus 10 includes a melting nozzle 110, a temperature sensor 120, a feeding roller set 130, a controller 140, a cooling module 150, a heating module 160, and a feeding speed adjustment module 170, functions of which are described below.

Figure 2:
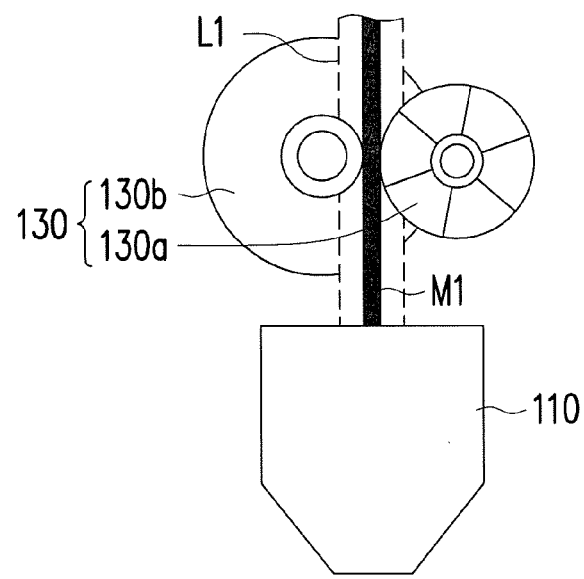
FIG. 2 is a schematic diagram illustrating a melting nozzle and a feeding roller set according to an exemplary embodiment.

For clearly explaining the exemplary embodiment, FIG. 2 is a schematic diagram illustrating the melting nozzle and the feeding roller set according to an exemplary embodiment. With reference to FIG. 1 and FIG. 2, in this embodiment, the three-dimensional printing apparatus 10 includes a feeding channel L1 connected to the melting nozzle 110. The feeding roller set 130 is disposed to the feeding channel L1 for feeding a feed material M1, used for printing the three-dimensional object, to the melting nozzle 110. More specifically, the feeding roller set 130 includes an active roller 130a and a passive roller 130b, which are disposed at two opposite sides of the feeding channel L1. The active roller 130a and the passive roller 130b clamp and hold the feed material M1 in the feeding channel L1 and move the feed material M1 in a transport direction. Simply put, the feed material M1 is provided as a base material for producing the three-dimensional object.

In this embodiment, the feed material M1 may be any type of material that is suitable for fabrication methods, such as fused filament fabrication (FFF), melted and extrusion modeling, etc. For example, the feed material M1 may be a hot melt wire material suitable for fused filament fabrication.

For example, the feed material M1 transported to the melting nozzle 110 is heated by the melting nozzle 110 and melted into a liquid material in a melted state, and then the melted feed material M1 is extruded through the melting nozzle 110.

In this embodiment, the temperature sensor 120 is coupled to the melting nozzle 110. The coupling includes directly disposing the temperature sensor 120 on the melting nozzle 110, for example. The temperature sensor 120 is configured to sense an initial conversion temperature of the melting nozzle 110. The controller 140 is a device having an operation function, such as a central processing unit, a chip set, a microprocessor, an embedded controller, etc. Nevertheless, the disclosure is not limited thereto. The controller 140 is coupled to the melting nozzle 110, the feeding roller set 130, and the temperature sensor 120 for reading the digital three-dimensional model information and controlling an entire operation of the three-dimensional printing apparatus 10 according to the digital three-dimensional model information, so as to print out the three-dimensional object. For instance, the controller 140 is capable of controlling a feeding speed of the feeding roller set 130.

In this embodiment, when the three-dimensional printing apparatus 10 intends to print a three-dimensional object with at least two types of materials, the controller 140 determines a sequence of using these types of feed materials according to the digital three-dimensional model information. In addition, the controller 140 may further adjust a temperature of the melting nozzle 110 according to the types of the feed materials. More specifically, when the controller 140 determines to execute a feed material switch procedure during printing of the three-dimensional object, the three-dimensional printing apparatus 10 switches the feed material M1 in the feeding channel L1 from a first feed material to a second feed material. The first feed material and the second feed material are different materials and have different melting points. Accordingly, the controller 140 adjusts the initial conversion temperature of the melting nozzle 110 and thereby melts the first feed material and the second feed material respectively using ideal temperatures in the feed material switch procedure.

In this embodiment, a melting point temperature of the first feed material is a first melting point temperature, and a melting point temperature of the second feed material is a second melting point temperature. It should be noted that the controller 140 does not adjust the temperature of the melting nozzle 110 to the second melting point temperature directly during the feed material switch procedure. Instead, the controller 140 first compares the first melting point temperature with the second melting point temperature and sets the higher one of the first melting point temperature and the second melting point temperature as the initial conversion temperature of the melting nozzle 110. Then, no matter which of the first melting point temperature and the second melting point temperature is higher, the controller 140 adjusts the initial conversion temperature of the melting nozzle 110 to the second melting point temperature, so as to use the second melting point temperature, which is suitable for melting the second feed material, for melting after switching of the feed materials. In an exemplary embodiment, the cooling module 150 is coupled to the controller 140 and performs a cooling procedure on the melting nozzle 110 so as to lower the initial conversion temperature.

In an exemplary embodiment, the feeding speed adjustment module 170 is coupled to the controller 140 and the feeding roller set 130, and the feeding speed adjustment module 170 controls the feeding speed of the feeding roller set 130 to be an acceleration state, a deceleration state, or a normal state. The heating module 160 is coupled to the controller 140 and the melting nozzle 110 and performs a heating procedure on the melting nozzle 110 so as to raise the initial conversion temperature.

Figure 3:
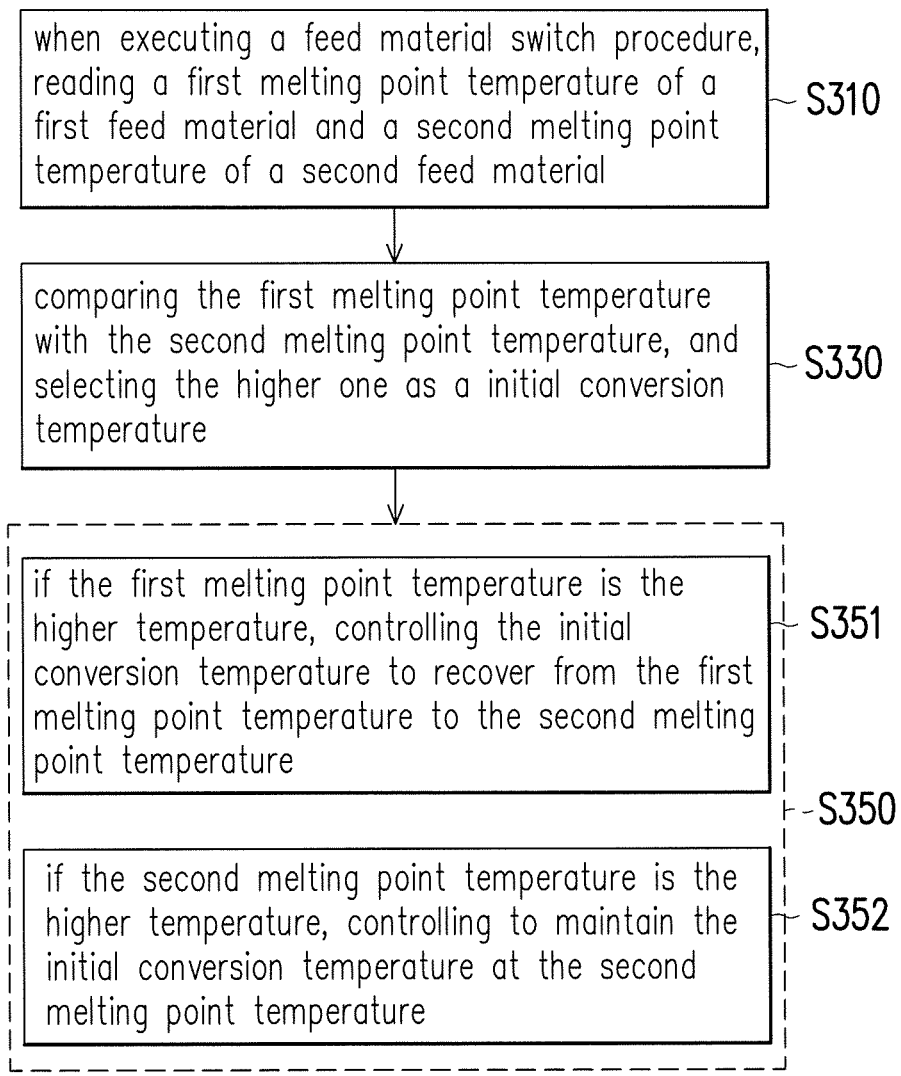
FIG. 3 is a flowchart illustrating a nozzle temperature adjustment method according to an exemplary embodiment.

An embodiment is described in detail below to explain how the controller 140 adjusts the temperature of the melting nozzle 110 in the disclosure. FIG. 3 is a flowchart illustrating a nozzle temperature adjustment method according to an exemplary embodiment. The method of this embodiment is adapted for the three-dimensional printing apparatus 10 of FIG. 1. Steps of the nozzle temperature adjustment method of this embodiment are explained in detail hereinafter with reference to the elements of the three-dimensional printing apparatus 10. In this embodiment, the controller 140 controls the feeding roller set 130 to feed materials to the melting nozzle 110.

First, in Step S310, when executing the feed material switch procedure to switch from the first feed material to the second feed material, the controller 140 reads the first melting point temperature of the first feed material and the second melting point temperature of the second feed material. Further, the controller 140 may determine the types of materials used for printing the three-dimensional object according to the digital three-dimensional model information. In addition, in this embodiment, the controller 140 reads the first melting point temperature of the first feed material and the second melting point temperature of the second feed material by a look-up table mechanism, for example. It should be noted that, when the controller 140 executes the feed material switch procedure, although the second feed material is sent into the feeding channel L1, residual first feed material may exist in the melting nozzle 110 or the feeding channel L1.

Thus, in Step S330, the controller 140 compares the first melting point temperature with the second melting point temperature and selects the higher one of the first melting point temperature and the second melting point temperature as the initial conversion temperature. In a slag processing procedure of this embodiment, the controller 140 determines which of the first melting point temperature and the second melting point temperature is higher and sets the higher one of the first melting point temperature and the second melting point temperature as the initial conversion temperature of the melting nozzle 110, and then maintains the initial conversion temperature of the melting nozzle 110 at the higher temperature. Since the initial conversion temperature is not adjusted and lowered to the second melting point temperature directly (in a condition that the second melting point temperature is lower than the first melting point temperature), jam of the first feed material in the melting nozzle 110, the feeding channel L1 and/or the feeding roller set 130, which results from the fact that the second melting point temperature is insufficient to completely melt the residual first feed material, is prevented.

It should be noted that the slag processing procedure begins with determining which of the first melting point temperature and the second melting point temperature is higher. During the slag processing procedure, the controller 140 heats the melting nozzle 110 according to the higher temperature, so as to ensure that the residual first feed material is completely melted and discharged from the melting nozzle 110. After a preset time, the slag processing procedure ends. In an embodiment, the preset time of the slag processing procedure may be a predetermined value that is set in advance. However, the disclosure is not limited thereto. In another embodiment, the controller 140 dynamically determines the preset time of the slag processing procedure according to different determining mechanisms. For example, the controller 140 may determine to end the slag processing procedure depending on a mechanism that determines whether the first feed material is discharged completely.

It is worth mentioning that, in an embodiment, during the slag processing procedure, the controller 140 controls the melting nozzle 110 to move to another platform that does not carry the three-dimensional object for the melting nozzle 110 to extrude and stack the residual first feed material on the another platform.

Thereafter, in order to adjust the temperature of the melting nozzle 110 back to the temperature suitable for melting the second feed material, in Step S350, the controller 140 adjusts the initial conversion temperature to the second melting point temperature when the slag processing procedure ends. Further to the above, during the slag processing procedure, the initial conversion temperature of the melting nozzle 110 should be the higher one of the first melting point temperature and the second melting point temperature. Therefore, Step S350 may be executed in two steps. In Step S351, if the first melting point temperature is the higher temperature, the controller 140 controls the initial conversion temperature to recover/drop from the first melting point temperature to the second melting point temperature. In Step S352, if the second melting point temperature is the higher temperature, the controller 140 controls to maintain the initial conversion temperature at the second melting point temperature.

Figure 4A:
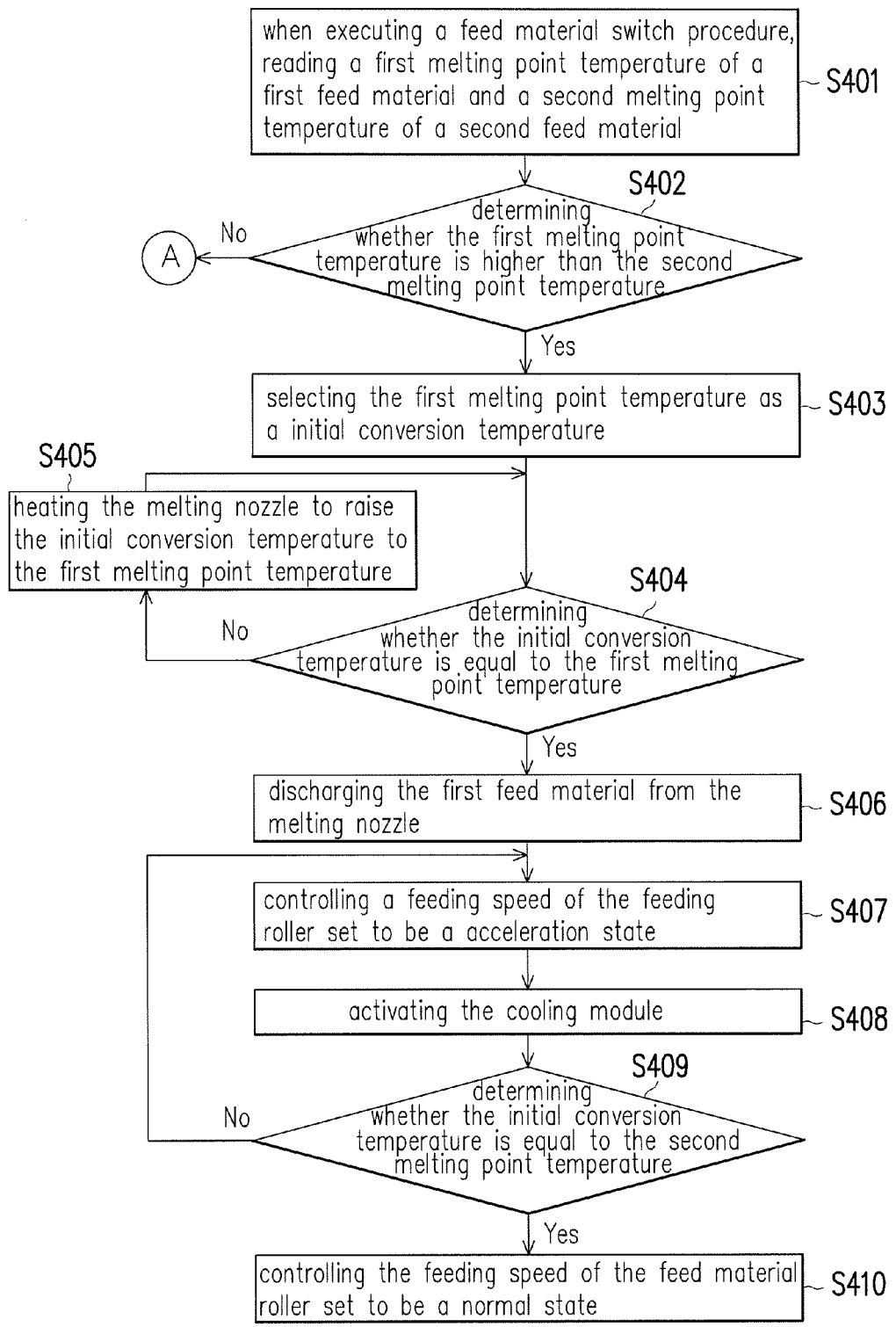
FIG. 4A and FIG. 4B are flowcharts respectively illustrating a nozzle temperature adjustment method according to another exemplary embodiment.
Figure 4B:
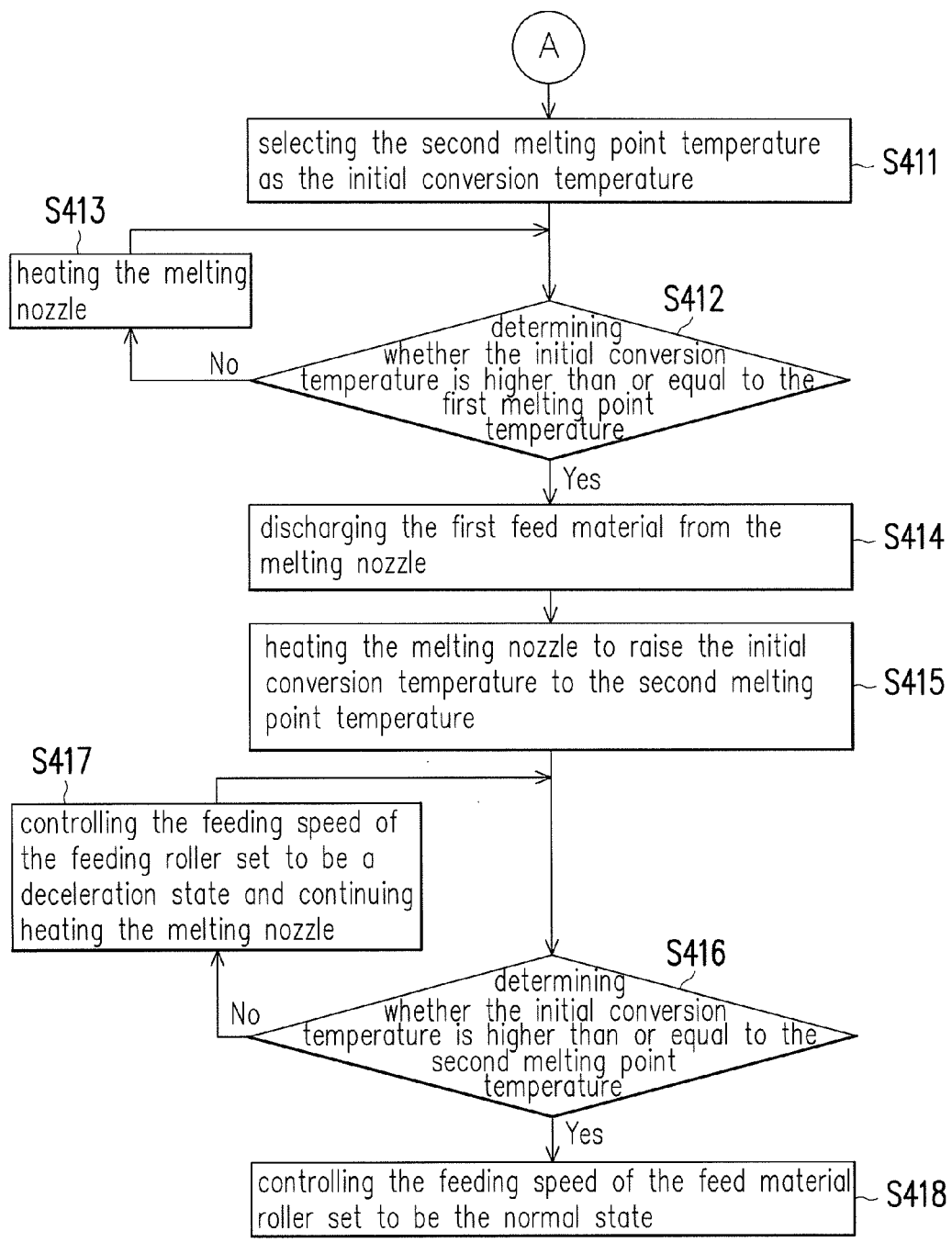

It should be noted that embodiments of the disclosure are not limited to the foregoing descriptions. The above embodiments may be varied/modified according to the actual requirements. FIG. 4A and FIG. 4B are flowcharts respectively illustrating a nozzle temperature adjustment method according to another exemplary embodiment. The method of this embodiment is adapted for the three-dimensional printing apparatus 10 of FIG. 1. Steps of the nozzle temperature adjustment method of this embodiment are explained in detail hereinafter with reference to the elements of the three-dimensional printing apparatus 10.

First, referring to FIG. 4A, in Step S401, when executing the feed material switch procedure to switch from the first feed material to the second feed material, the controller 140 reads the first melting point temperature of the first feed material and the second melting point temperature of the second feed material. Further to the above, during the slag processing procedure, the controller 140 selects the higher one of the first melting point temperature and the second melting point temperature as the initial conversion temperature. Therefore, in Step S402, the controller 140 determines whether the first melting point temperature is higher than the second melting point temperature. If the result of Step S402 is Yes, it indicates that the second melting point temperature of the second feed material that enters the melting nozzle 110 later is lower. In Step S403, the controller 140 selects the first melting point temperature as the initial conversion temperature of the melting nozzle 110.

In order to maintain the initial conversion temperature of the melting nozzle 110 at the first melting point temperature during the slag processing procedure, in Step S404, the temperature sensor 120 senses the initial conversion temperature of the melting nozzle 110 and the controller 140 determines whether the initial conversion temperature is equal to the first melting point temperature according to a sensing result of the temperature sensor 120. If the result of Step S404 is No, the controller 140 heats the melting nozzle 110 to raise the initial conversion temperature to the first melting point temperature.

If the result of Step S404 is Yes, it indicates that the initial conversion temperature of the melting nozzle 110 is equal to the first melting point temperature, and the initial conversion temperature is sufficient to melt and discharge the residual first feed material. Hence, in Step S406, the controller 140 controls the three-dimensional printing apparatus 10 to discharge the residual first feed material from the melting nozzle 110.

Further to the above, the initial conversion temperature of the melting nozzle 110 is maintained at the first melting point temperature, which is the higher temperature, in Steps S403 to S405. Therefore, in order to recover/lower the initial conversion temperature to the second melting point temperature, if the initial conversion temperature is not equal to the second melting point temperature, in Step S407, the controller 140 controls the feeding speed of the feeding roller set 130 to be the acceleration state. When the feeding speed is in the acceleration state, the second feed material that has the lower melting point is melted and passes through the melting nozzle 110 quickly, so as to prevent deterioration of the second feed material due to high temperature. On the other hand, the increase of the feeding speed causes the initial conversion temperature of the melting nozzle 110 to drop and simultaneously achieves the purpose of cooling the melting nozzle 110.

Additionally, in order to lower the initial conversion temperature of the melting nozzle 110 from the first melting point temperature to the second melting point temperature, the controller 140 further activates other cooling equipment to cool the melting nozzle 110 in addition to accelerating the feeding speed. In this embodiment, in Step S408, the controller 140 activates the cooling module 150 to perform a cooling procedure on the melting nozzle 110, so as to lower the initial conversion temperature of the melting nozzle 110.

In Step S409, the temperature sensor 120 senses the initial conversion temperature and the controller 140 determines whether the initial conversion temperature is equal to the second melting point temperature. If the result of Step S409 is Yes, in Step S410, the controller 140 controls the feeding speed of the feeding roller set 130 to be the normal state. On the other hand, in this embodiment, if the result of Step S409 is No, the method returns to Step S407 and Step S408 for the controller 140 to maintain the feeding speed in the acceleration state and continue cooling the melting nozzle 110 by the cooling module. Although the initial conversion temperature of the melting nozzle 110 is lowered by both controlling the feeding speed and using the cooling module in this embodiment, the disclosure is not limited thereto. In other embodiments, the controller 140 may lower the initial conversion temperature from the first melting point temperature to the second melting point temperature simply by controlling the feeding speed or by other cooling methods.

On the other hand, if the result of Step S402 is No, it indicates that the second melting point temperature is higher than the first melting point temperature. Therefore, with reference to FIG. 4B, in Step S411, the controller 140 selects the second melting point temperature as the initial conversion temperature. It should be noted that, before the initial conversion temperature of the melting nozzle 110 goes up to the second melting point temperature, in order to discharge the residual first feed material, the controller 140 determines whether the initial conversion temperature is higher than or equal to the first melting point temperature in Step S412. If the result of Step S412 is No, in Step S413, the controller 140 heats the melting nozzle 110. If the result of Step S412 is Yes, it indicates that the temperature of the melting nozzle 110 is sufficient to melt the first feed material. Thus, in Step S414, the controller 140 discharges the residual first feed material from the melting nozzle 110.

Additionally, in Step S415, the controller 140 heats the melting nozzle 110 to raise the initial conversion temperature to the second melting point temperature. It should be noted that the sequence of Step S415 and Steps S412 to S414 is not limited to the embodiment as disclosed in FIG. 4B. The time and sequence of executing the aforementioned steps may be designed and varied according to the actual application. For example, in another embodiment, the controller 140 first executes the step of heating the melting nozzle 110 to the second melting point temperature. As soon as the controller 140 determines that the initial conversion temperature is higher than the first melting point temperature, the controller 140 controls the three-dimensional printing apparatus 10 to discharge the residual first feed material.

Next, in Step S416, the controller 140 determines whether the initial conversion temperature is equal to the second melting point temperature. If the result of Step S416 is No, in Step S417, the controller 140 controls the feeding speed of the feeding roller set 130 to be the deceleration state and continues heating the melting nozzle 110. Because the initial conversion temperature does not go up to the ideal second melting point temperature, when the feeding speed is in the deceleration state, dropping of the initial conversion temperature of the melting nozzle 110 due to melting of the feed material is suppressed, so as to reduce the time that the controller 140 requires for heating the melting nozzle 110 to the second melting point temperature. Besides, when the feeding speed is in the deceleration state, the time that the melting nozzle 110 heats the second feed material having a higher melting point may be increased to suppress the problem of incomplete melting of the second feed material resulting from insufficient temperature of the melting nozzle 110. Nevertheless, if the result of Step S416 is Yes, the controller 140 controls the feeding speed of the feeding roller set 130 to be the normal state in Step S418.

Moreover, in this embodiment, besides selecting the higher one of the first melting point temperature and the second melting point temperature as the initial conversion temperature, the feeding speed may be adjusted in different melting point conversion scenarios. The adjustment of the feeding speed not only helps control the temperature of the melting nozzle but also prevents deterioration of the feed materials due to excessively high melting temperature or jam due to low melting temperature.

To sum up, the exemplary embodiment utilizes the higher one of the first melting point temperature and the second melting point temperature as the initial conversion temperature of the melting nozzle during the switch of the feed materials for discharging the residual first feed material that enters the melting nozzle first. Therefore, the problem of slag of the first feed material in the nozzle or the feeding roller set due to insufficient melting temperature is prevented. In addition, the exemplary embodiment further adjusts the feeding speed of the three-dimensional printing apparatus in accordance with the temperature difference between the first melting point of the first feed material that enters the melting nozzle first and the second melting point of the second feed material that enters the melting nozzle later. Accordingly, the residual first feed material is successfully discharged, and deterioration or jam of the feed materials due to inappropriate melting temperature is improved to save time for maintenance and replacement of the components.

It will be apparent to those skilled in the art that various modifications and variations can be made to the disclosed embodiments without departing from the scope or spirit of the disclosure. In view of the foregoing, it is intended that the disclosure covers modifications and variations of this disclosure provided that they fall within the scope of the following claims and their equivalents.

What is claimed is:

1. A three-dimensional printing apparatus, comprising:
a melting nozzle;
a feeding roller set feeding a first feed material or a second feed material to the melting nozzle;
a temperature sensor coupled to the melting nozzle for sensing an initial conversion temperature of the melting nozzle; and
a controller coupled to the melting nozzle, the feeding roller set, and the temperature sensor for comparing a first melting point temperature of the first feed material and a second melting point temperature of the second feed material when switching a status from feeding the first feed material to the melting nozzle to feeding the second feed material to the melting nozzle, and selecting a higher melting point temperature from the first melting point temperature and the second melting point temperature as the initial conversion temperature,
wherein after executing a slag processing procedure according to the initial conversion temperature, the controller controls the initial conversion temperature to recover from the first melting point temperature to the second melting point temperature if the first melting point temperature is the higher melting point temperature,
wherein after executing the slag processing procedure according to the initial conversion temperature, the controller controls the initial conversion temperature to maintain at the second melting point temperature if the second melting point temperature is the higher melting point temperature.

2. The three-dimensional printing apparatus according to claim 1, further comprising a cooling module coupled to the controller and performing a cooling procedure on the melting nozzle to lower the initial conversion temperature.

3. The three-dimensional printing apparatus according to claim 1, further comprising a feeding speed adjustment module coupled to the controller and the feeding roller set for controlling a feeding speed of the feeding roller set to be an acceleration state, a deceleration state, or a normal state.

4. The three-dimensional printing apparatus according to claim 1, further comprising a heating module coupled to the controller and the melting nozzle and performing a heating procedure on the melting nozzle to raise the initial conversion temperature.

* * * * *